(12) United States Patent
Talyansky et al.

(10) Patent No.: US 9,322,709 B2
(45) Date of Patent: Apr. 26, 2016

(54) LUMINESCENT INFRARED TRANSPARENT STICKER

(71) Applicants: Vitaly Talyansky, Portland, OR (US); Edward Talyansky, Battle Ground, WA (US)

(72) Inventors: Vitaly Talyansky, Portland, OR (US); Edward Talyansky, Battle Ground, WA (US)

(73) Assignee: Stardust Materials, LLC, Vancouver, WA (US)

( * ) Notice: Subject to any disclaimer, the term of this patent is extended or adjusted under 35 U.S.C. 154(b) by 88 days.

(21) Appl. No.: 14/313,867

(22) Filed: Jun. 24, 2014

(65) Prior Publication Data

US 2015/0369659 A1   Dec. 24, 2015

(51) Int. Cl.
| | | |
|---|---|---|
| *G01J 5/02* | (2006.01) | |
| *G01J 1/42* | (2006.01) | |
| *B42D 25/36* | (2014.01) | |
| *G07D 7/12* | (2016.01) | |
| *B42D 25/382* | (2014.01) | |
| *G09F 3/00* | (2006.01) | |
| *G09F 3/02* | (2006.01) | |

(52) U.S. Cl.
CPC . *G01J 1/42* (2013.01); *B42D 25/36* (2014.10); *B42D 25/382* (2014.10); *G07D 7/12* (2013.01); *G09F 3/0294* (2013.01); *G09F 2003/0276* (2013.01)

(58) Field of Classification Search
CPC .................................... G01J 1/42; G07D 7/12
See application file for complete search history.

(56) References Cited

U.S. PATENT DOCUMENTS

2010/0102250 A1*  4/2010  Li ................. C09K 11/0883
                                                          250/459.1

\* cited by examiner

*Primary Examiner* — David Porta
*Assistant Examiner* — Edwin Gunberg (57) ABSTRACT

A luminescent infrared transparent sticker is disclosed herein. An example apparatus includes a substrate that is transparent with respect to light at a first wavelength and light at a second wavelength and an adhesive on a first side of the substrate, wherein the adhesive contains taggant that has luminescent properties such that when the taggant is illuminated with light at the first wavelength, it emits light at the second wavelength.

12 Claims, 6 Drawing Sheets

LUMINESCENT INFRARED TRANSPARENT STICKER

FIELD OF THE DISCLOSURE

The present disclosure relates generally to product authentication and, more particularly, to a luminescent infrared transparent sticker.

BACKGROUND

Authentic products can be copied and/or counterfeited and these counterfeit products may be sold or used by consumers. Counterfeit products can be harmful to the producers and resellers of authentic products and to the consumers of counterfeit products.

DETAILED DESCRIPTION

Counterfeit products can cause significant economic and other damage to both the purveyor of authentic non-counterfeit products and the consumer of the counterfeit products. In order to combat counterfeiting, many products contain materials embedded in the product and/or in the packaging and/or labeling for the product that allow the product to be authenticated. Counterfeit products will not have this embedded material and therefore cannot be authenticated.

One method of authenticating a product is to place a sticker or label that contains such embedded material on the product. The product is then authenticated by detecting the material embedded in the sticker. This allows for detection of counterfeit products since they will not have a sticker with the appropriate embedded material. Alternatively, the sticker itself may be the item to be authenticated (e.g., a postage stamp). In this case, the sticker is authenticated by detecting the embedded material and counterfeit stickers will not have the appropriate material.

Example methods, apparatus, and/or articles of manufacture disclosed herein provide a luminescent infrared transparent sticker. In examples disclosed herein, one side of the sticker has adhesive to affix the sticker to a product or other surface. In examples disclosed herein, the adhesive on the sticker contains embedded luminescent materials that emit light at a particular wavelength when illuminated by and excited by light at a different wavelength. In examples disclosed herein, the other side of the sticker is transparent to light at the wavelength that excites the luminescent materials in the adhesive. In examples disclosed herein, this side of the sticker contains a dye that has luminescent properties. In examples disclosed herein, the sticker and/or the product with the sticker is authenticated by illuminating the sticker with light at a wavelength that causes luminescence in the embedded materials in the adhesive and/or the dye and detecting the luminescent response.

Figure 1:
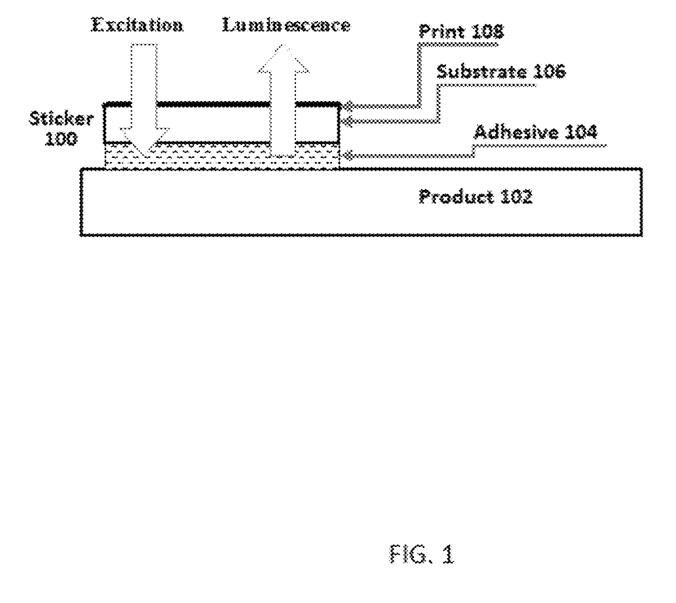
FIG. 1 is a block diagram of an example luminescent infrared transparent sticker constructed in accordance with the teachings of this disclosure.

FIG. 1 is a block diagram of an example luminescent infrared transparent sticker constructed in accordance with the teachings of this disclosure. The example of FIG. 1 includes a sticker 100 and a product 102. The example sticker 100 of FIG. 1 includes an adhesive 104, a substrate 106 and print 108.

In the illustrated example, the product 102 is an item to be protected and/or authenticated. The example product 102 may be a consumer good, a box or packaging, a document, an envelope, or any other item. In the illustrated example, the sticker 100 is affixed to the product 102. The example product 102 and/or the example sticker 100 are authenticated as taught in this disclosure.

In the illustrated example, the adhesive 104 is a material that causes the sticker 100 to stick to the product 102. The example adhesive 104 may be any type of glue or material to affix the example sticker 100 to the example product 102. In the illustrated example, the adhesive 104 contains taggant, which is a material that has luminescent properties such that when it is illuminated by light or other electromagnetic radiation at a certain wavelength (i.e., the excitation wavelength of the taggant), it emits light or other electromagnetic radiation at a different wavelength (i.e., the emission wavelength of the taggant). In the illustrated example, the excitation wavelength and the emission wavelength of the taggant are both in the infrared portion of the electromagnetic spectrum. In other examples, the excitation and/or emission wavelengths may be in the visible, ultra-violet or any other portion of the electromagnetic spectrum.

In the illustrated example, the substrate 106 comprises the body of the sticker 100. The example substrate 106 is a thin and flexible material that can be affixed to the example product 102 with the example adhesive 104. In the illustrated example, the substrate 106 is made from paper. In other examples, the substrate 106 may be made from any other material. One side of the example substrate 106 contains the example adhesive 104. The other side of the example substrate 106 contains the example print 108. In the illustrated example, the substrate 106 is transparent with respect to light at the excitation and emission wavelengths of the taggant in the adhesive 104. That is, when the example substrate 106 is illuminated by light at the excitation wavelength of the taggant in the example adhesive 104, the light passes through the substrate 106 and illuminates the taggant in the adhesive 104 to luminesce. Furthermore, when the taggant in the example adhesive 104 luminesces and emits light at its emission wavelength, this light passes through the example substrate 106.

In the illustrated example, the print 108 is printed on top of the substrate 106 using a dye. In other examples, the print 108 may be printed with an ink or any other material to mark the substrate 106. The example print 108 may consist of text and/or images or symbols that identify the example sticker 100 and/or the example product 102. In some examples, the print 108 is an ornamental design. In some examples, the print 108 is a barcode. In the illustrated example, the print 108 consists of a dye that has luminescent properties such that when it is illuminated by light at a certain wavelength (i.e., the excitation wavelength of the dye), it emits light at a different wavelength (i.e., the emission wavelength of the dye). In the illustrated example, the emission wavelength of the dye is equal to the excitation wavelength of the taggant in the adhesive 104. In other examples, the emission wavelength of the dye is different than the excitation wavelength of the taggant in the adhesive 104. In some examples, the print 108 is a non-luminescent material and may be printed with any type of ink or marking material. In the illustrated example, the substrate 106 is transparent with respect to the emission wavelength of the dye in the print 108.

In the illustrated example, the dye that is used for the print 108 is transparent with respect to the emission wavelength of the taggant in the adhesive 104. In the illustrated example, when the dye in the print 108 is excited by light at its excitation wavelength, the dye emits light at its emission wavelength, which is also the excitation wavelength of the taggant in the adhesive 104. In the illustrated example, this light excites the taggant in the adhesive 104 and causes the taggant to luminesce and emit light at its emission wavelength. In the illustrated example, this light passes through the substrate 106 and the print 108 and is detected as taught by this disclosure.

In some examples, the emission wavelength of the dye in the print 108 is not the same as the excitation wavelength of the taggant in the adhesive 104. In these examples, the print 108 is illuminated with light at the excitation wavelength of the dye causing a luminescent emission of light at the emission wavelength of the dye and the adhesive 104 is illuminated with light at the excitation wavelength of the taggant in the adhesive 104 causing a luminescent emission of light at the emission wavelength of the taggant. In these examples, the light at each of these emission wavelengths is detected in order to authenticate the sticker 100, thereby providing two types of security in the sticker 100.

Figure 2:
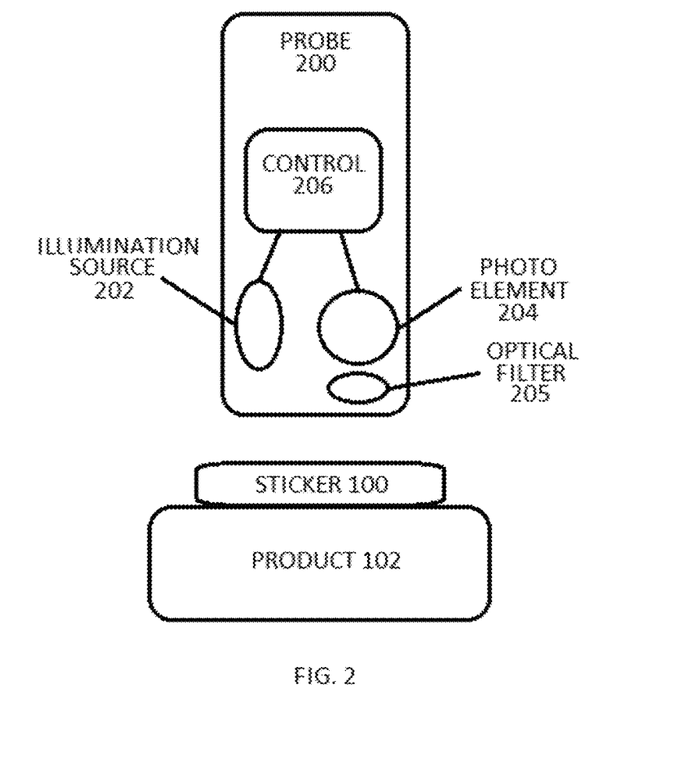
FIG. 2 is a block diagram of a system for authenticating a product using the example luminescent infrared transparent sticker of FIG. 1.

FIG. 2 is a block diagram of a system for authenticating a product using the example luminescent infrared transparent sticker of FIG. 1. The example of FIG. 2 includes a probe 200, the sticker 100 of FIG. 1 and the product 102 of FIG. 1. The example probe 200 includes an illumination source 202, a photo element 204, an optical filter 205 and a control 206.

In the illustrated example, the probe 200 is a hand-held device that includes the illumination source 202, the photo element 204 and the control 206. In other examples, the probe 200 may be a device that is not hand-held and/or it may be part of a larger machine, device or system. In the illustrated example, the probe 200 is operated manually by pushing a button or otherwise activating it. In other examples, the probe 200 may be operated automatically by computer or machine. In the illustrated example, the illumination source 202 is a laser that emits light at one or more wavelengths. In other examples, the illumination source 202 may consist of a light emitting diode or other source to emit light at one or more wavelengths. In some examples, the illumination source 202 consists of multiple lasers and/or light emitting diodes and/or other devices that each emit light at a different wavelength.

In the illustrated example, the illumination source 202 emits light at a wavelength equal to the excitation wavelength of the dye in the print 108. In some examples, the illumination source 202 emits light at a wavelength equal to the excitation wavelength of the taggant in the adhesive 104. In other examples, the illumination source 202 emits light at wavelengths equal to the excitation wavelength of the taggant in the adhesive 104 of FIG. 1 and the excitation wavelength of the dye in the print 108 of FIG. 1 either sequentially or simultaneously.

In the illustrated example, the photo element 204 detects light emitted by the sticker 100. In the illustrated example, the photo element 204 is a photodiode. In other examples, the photo element 204 may consist of another device or element capable of detecting the light emitted by the example sticker 100.

In the illustrated example, the optical filter 205 filters out light at wavelengths other than the emission wavelengths of the taggant in the adhesive 104 and the dye in the print 108. Any type of filter may be used as the optical filter 205.

The example control 206 communicates with and controls the example illumination source 202 and the example photo element 204. The example control 206 determines whether the example product 102 and/or the example sticker 100 is authentic by measuring the amount of light detected by the example photo element 204 after the example illumination source 202 illuminates the sticker 100 as discussed in connection with FIGS. 3-5. In some examples, the control 206 gives a visual, audio or other indication of whether the product 102 and/or the sticker 100 is deemed authentic.

While an example manner of implementing the luminescent infrared transparent sticker has been illustrated in FIG. 2, one or more of the elements, processes and/or devices illustrated in FIG. 2 may be combined, divided, re-arranged, omitted, eliminated and/or implemented in any other way. Further, the example illumination source 202, the example photo element 204, the example optical filter 205, the example control 206 and/or, more generally, the example probe 200 of FIG. 2 may be implemented by hardware, software, firmware and/or any combination of hardware, software and/or firmware. Thus, for example, any of the example illumination source 202, the example photo element 204, the example optical filter 205, the example control 206 and/or, more generally, the example probe 200 of FIG. 2 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example illumination source 202, the example photo element 204, the example optical filter 205, the example control 206 and/or, more generally, the example probe 200 of FIG. 2 is hereby expressly defined to include a tangible computer readable storage medium such as a memory, DVD, CD, Blu-ray, etc. storing the software and/or firmware. Further still, the example illumination source 202, the example photo element 204, the example optical filter 205, the example control 206 and/or, more generally, the example probe 200 of FIG. 2 may include more than one of any or all of the illustrated elements, processes and devices.

Figure 3:
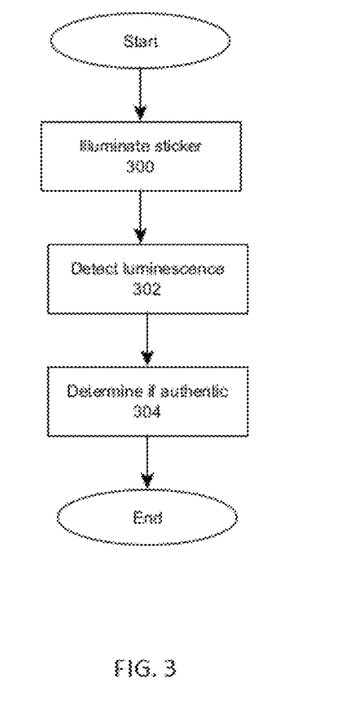
FIG. 3 is a flowchart representative of example machine readable instructions that may be executed to implement the example luminescent infrared transparent sticker of FIGS. 1 and 2.
Figure 4:
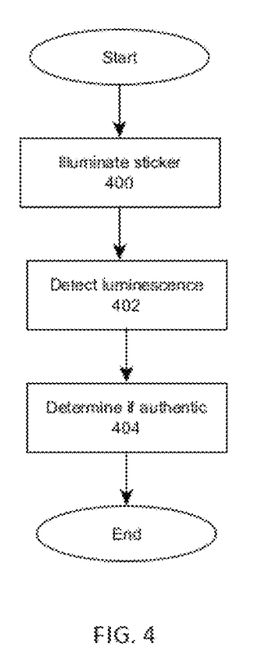
FIG. 4 is a flowchart representative of example machine readable instructions that may be executed to implement the example luminescent infrared transparent sticker of FIGS. 1 and 2.
Figure 5:
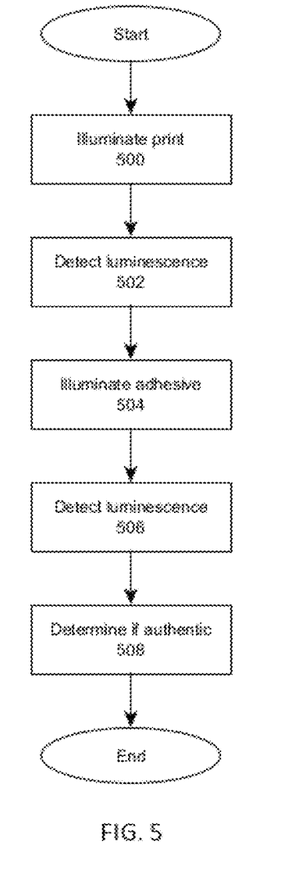
FIG. 5 is a flowchart representative of example machine readable instructions that may be executed to implement the example luminescent infrared transparent sticker of FIGS. 1 and 2.

FIGS. 3-5 are flowcharts representative of example machine readable instructions for implementing the example luminescent infrared transparent sticker of FIGS. 1 and 2. In the example flowcharts of FIGS. 3-5, the machine readable instructions comprise program(s) for execution by a processor such as the processor 612 shown in the example computer 600 discussed below in connection with FIG. 6. The program(s) may be embodied in software stored on a tangible computer readable storage medium such as a CD-ROM, a floppy disk, a flash drive, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is described with reference to the flowcharts illustrated in FIGS. 3-5, many other methods of implementing the example luminescent infrared transparent sticker of FIGS. 1 and 2 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIGS. 3-5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 3 begins when the example illumination source 202 illuminates the example sticker 100 with light at a wavelength equal to the excitation wavelength of the dye in the example print 108 (block 300). When the dye in the example sticker 100 is illuminated with light at its excitation wavelength, it luminesces and emits light at its emission wavelength, which, in the illustrated example of FIG. 3 is equal to the excitation wavelength of the taggant in the example adhesive 104. Because the example substrate 106 is transparent with respect to light at this wavelength, this light passes through the substrate 106 and illuminates the taggant in the example adhesive 104. When the example adhesive 104 is illuminated with this light at its excitation wavelength, it luminesces and emits light at its emission wavelength. Because the example substrate 106 is transparent to light at this wavelength, this light passes through the substrate 106 and illuminates the example probe 200.

A short time after the example illumination source 202 emits light at the excitation wavelength of the dye in the example print 108 (block 300) (i.e., enough time for a luminescent response to occur in the taggant in the example adhesive 104 and illuminate the example probe 200), the example photo element 204 detects the light emitted by the taggant in the adhesive 104 (block 302). The light emitted by the taggant in the example adhesive 104 passes through the example substrate 106 and through the example optical filter 205. The example optical filter 205 blocks out most of the light other than the light emitted by the taggant in the example adhesive 104, thereby allowing the example photo element 204 to detect only the light at a wavelength equal to the emission wavelength of the taggant in the adhesive 104 (i.e., only the light actually emitted as a result of the luminescent response of the taggant in the adhesive 104).

After the example photo element 204 detects the light emitted by the taggant in the example adhesive 104 (block 302), the example control 206 determines if the example sticker 100 is authentic (block 304). This determination is made by determining if the amount of light detected by the example photo element in block 302 is above a threshold. This threshold is set according to a calibration based on the particular characteristics of the example photo element 204 and the taggant in the example adhesive 104. After the example control 206 determines if the example sticker 100 is authentic (block 304), the example of FIG. 3 ends.

FIG. 4 is a flowchart representative of alternative example machine readable instructions for implementing the example luminescent infrared transparent sticker of FIGS. 1 and 2. In the example of FIG. 4, the print 108 does not contain luminescent materials. FIG. 4 begins when the example illumination source 202 illuminates the example sticker 100 with light at the wavelength equal to the excitation wavelength of the taggant in the example adhesive 104 (block 400). Because the example substrate 106 of the example sticker 100 is transparent with respect to light at this excitation wavelength, the light emitted by the example illumination source 202 passes through the substrate 106 and excites the taggant in the example adhesive 104. When the taggant in the example adhesive 104 is excited by light at its excitation wavelength, it luminesces and emits light at its emission wavelength. Because the example substrate 106 is transparent with respect to light at this emission wavelength, the light emitted by the taggant in the example adhesive 104 passes through the substrate 106.

A short time after the example illumination source 202 emits light at the excitation wavelength of the taggant in the example adhesive 104 (block 400) (i.e., enough time for a luminescent response to occur), the example photo element 204 detects the light emitted by the taggant in the adhesive 104 (block 402). The light emitted by the taggant in the example adhesive 104 passes through the example substrate 106 and through the example optical filter 205. The example optical filter 205 blocks out most of the light other than that emitted by the taggant in the example adhesive 104 allowing the example photo element 204 to detect only the light at a wavelength equal to the emission wavelength of the taggant in the adhesive 104 (i.e., only the light actually emitted as a result of the luminescent response of the taggant in the adhesive 104).

After the example photo element 204 detects the light emitted by the taggant in the example adhesive 104 (block 402), the example control 206 determines if the example sticker 100 is authentic (block 404). This determination is made by determining if the amount of light detected by the example photo element 204 in block 302 is above a threshold. This threshold is set according to a calibration based on the particular characteristics of the example photo element 204 and the taggant in the example adhesive 104. After the example control 206 determines if the example sticker 100 is authentic (block 404), the example of FIG. 4 ends.

FIG. 5 is a flowchart representative of example alternative machine readable instructions for implementing the example luminescent infrared transparent sticker of FIGS. 1 and 2. In the example of FIG. 5, the emission wavelength of the dye in the print 108 is different than the excitation wavelength of the taggant in the adhesive 104. FIG. 5 begins when the example illumination source 202 illuminates the example print 108 with light at a wavelength equal to the excitation wavelength of the dye in the print 108 (block 500). This illumination causes the dye in the example print 108 to luminesce and emit light at its emission wavelength. A short time after the example illumination source 202 illuminates the example print 108 (block 500) (i.e., enough time for a luminescent response to occur), the example photo element 204 detects the light emitted by the dye in the example print 108 (block 502). The light emitted by the dye in the example print 108 passes through the example substrate 106 and through the example optical filter 205. The example optical filter 205 blocks out most of the light other than that emitted by the dye in the example print 108 allowing the example photo element 204 to detect only the light at a wavelength equal to the emission wavelength of the dye in the example print 108 (i.e., only the light actually emitted as a result of the luminescent response of the dye in the print 108).

After the example photo element 204 detects the light emitted by the dye in the example print 108 (block 502), the example illumination source 202 illuminates the sticker with light at a wavelength equal to the excitation wavelength of the taggant in the example adhesive 104 (block 504). Because the example substrate 106 is transparent to light at this excitation wavelength, this light passes through the substrate 106 and illuminates the taggant in the adhesive 104. This illumination excites the taggant in the example adhesive 104 and causes the taggant to luminesce and emit light at a wavelength equal to the emission wavelength of the taggant in the adhesive 104.

A short time after the example illumination source 202 illuminates the taggant in the example adhesive 104 (block 504) (i.e., enough time for a luminescent response to occur), the example photo element 204 detects the light emitted by the taggant in the adhesive 104 (block 506). The light emitted by the taggant in the example adhesive 104 passes through the example substrate 106 and through the example optical filter 205. The example optical filter 205 blocks out most of the light other than the light emitted by the taggant in the example adhesive 104 allowing the example photo element 204 to detect only the light at a wavelength equal to the emission wavelength of the taggant in the adhesive 104 (i.e., only the light actually emitted as a result of the luminescent response of the taggant in the adhesive 104).

After the example photo element 204 detects the light emitted by the taggant in the example adhesive 104 (block 506), the example control 206 determines if the example sticker 100 is authentic (block 508). This determination is made by determining if the amount of light detected by the example photo element 204 in blocks 502 and 506 is above respective thresholds. These thresholds are set according to a calibration based on the particular characteristics of the example photo element 204, the taggant in the example adhesive 104 and the dye in the example print 108. After the example control 206 determines if the example sticker 100 is authentic (block 508), the example of FIG. 5 ends.

Figure 6:
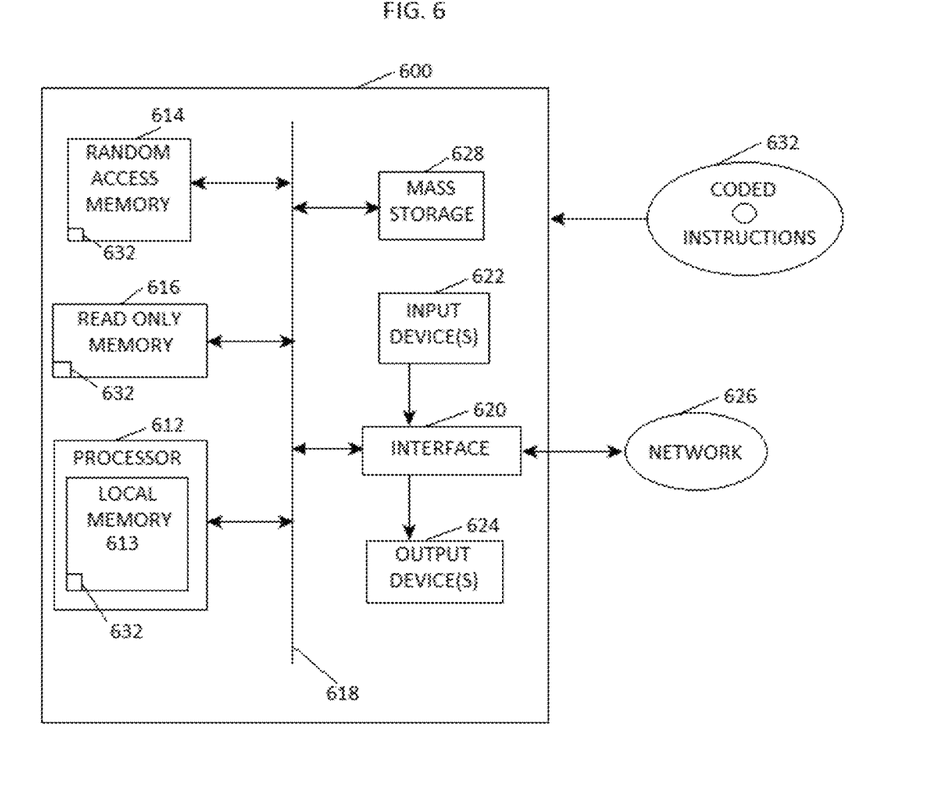
FIG. 6 is a block diagram of an example processing system capable of executing the example machine readable instructions of FIGS. 3-5 to implement the example luminescent infrared transparent sticker of FIGS. 1 and 2.

FIG. 6 is a block diagram of a processor platform 600 capable of executing the instructions of FIGS. 3-5 to implement the example luminescent infrared transparent sticker of FIGS. 1 and 2. The processor platform 600 can be, for example, a server, a personal computer, an Internet appliance, a DVD player, a CD player, a Blu-ray player, a gaming console, a personal video recorder, a smart phone, a tablet, a printer, or any other type of computing device.

The processor platform 600 of the instant example includes a processor 612. As used herein, the term "processor" refers to a logic circuit capable of executing machine readable instructions. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives.

The coded instructions 632 of FIG. 6 may be stored in the mass storage device 628, in the volatile memory 614, in the non-volatile memory 616, and/or on a removable storage medium such as a CD or DVD.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. An apparatus comprising:
    a substrate that is transparent with respect to light at a first wavelength and light at a second wavelength;
    an adhesive on a first side of the substrate, wherein the adhesive contains taggant that has luminescent properties such that when the taggant is illuminated with light at the first wavelength, it emits light at the second wavelength; and
    print on a second side of the substrate, wherein the print contains dye that has luminescent properties such that when the dye is illuminated with light at a third wavelength, it emits light at the first wavelength.

2. The apparatus of claim 1, wherein the first wavelength is in the infrared portion of the electromagnetic spectrum.

3. The apparatus of claim 1, wherein the first wavelength is in the visible portion of the electromagnetic spectrum.

4. The apparatus of claim 1, wherein the second wavelength is in the infrared portion of the electromagnetic spectrum.

5. The apparatus of claim 1, wherein the substrate is a postage stamp.

6. A method comprising:
illuminating a substrate with light at a first wavelength, the top of the substrate contains dye that has luminescent properties such that when the dye is illuminated with light at the first wavelength, it emits light at a second wavelength, the substrate is transparent with respect to light at the second wavelength and light at a third wavelength, the bottom of the substrate is coated with an adhesive that contains taggant having luminescent properties such that when the taggant is illuminated by light at the second wavelength, it emits light at the third wavelength;
detecting the light emitted by the taggant after the substrate is illuminated; and
determining whether the substrate is authentic based on the amount of light detected.

7. The method of claim 6, further comprising:
determining whether the substrate is authentic based on whether the amount of light detected is above a threshold amount.

8. The method of claim 6, wherein the first wavelength is in the infrared portion of the electromagnetic spectrum.

9. The method of claim 6, wherein the first wavelength is in the visible portion of the electromagnetic spectrum.

10. The method of claim 6, wherein the second wavelength is in the infrared portion of the electromagnetic spectrum.

11. The method of claim 6, wherein the third wavelength is in the infrared portion of the electromagnetic spectrum.

12. The method of claim 6, wherein the substrate is a postage stamp.

\* \* \* \* \*